United States Patent Office

3,766,169
Patented Oct. 16, 1973

3,766,169
PROCESS FOR THE PREPARATION OF 3-AMINO-METHYLIDENE - 1,5 - BENZODIAZEPINE-2,4-(3H,5H)-DIONES
Adolf Bauer, Ingelheim am Rhein, Karl Heinz Weber, Gau-Algesheim, and Karl-Heinz Pook, Ingelheim am Rhein, Germany, assignors to Boehringer Ingelheim G.m.b.H., Ingelheim am Rhein, Germany
No Drawing. Filed Oct. 27, 1971, Ser. No. 193,181
Claims priority, application Germany, Nov. 2, 1970, P 20 53 681.6
Int. Cl. C07d 53/04
U.S. Cl. 260—239.3 B                5 Claims

ABSTRACT OF THE DISCLOSURE

A process for the preparation of a 3-aminomethylidene-5-phenyl-1,5-benzodiazepine-2,4-(3H,5H)-dione by reacting a 5-phenyl - 1,5 - benzodiazepine-2,4-(3H,5H)-dione with a phosphorus pentahalide and a dialkylformamide, optionally adding ammonia or a primary or secondary amine to the reaction mixture, and recovering the reaction product. the 3-aminomethylidene-5-phenyl-1,5-benzodiazepine-2,4-(3H,5H)-diones obtained thereby are useful as intermediates for the preparation of other 3-substituted 1,5-benzodiazepine-2,4-(3H,5H)-diones having tranquilizing and anticonvulsive properties.

---

This invention relates to a novel process for the preparation of 3-aminomethylidene-5-phenyl-1,5-benzodiazepine-2,4-(3H,5H)-diones and acid addition salts thereof.

More particularly, the present invention relates to a novel process for the preparation of a 3-aminomethylidene-5-phenyl-1,5-benzodiazepine-2,4-(3H,5H)-dione of the formula

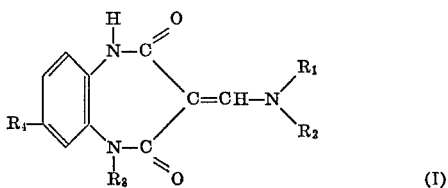

wherein $R_1$ and $R_2$, which may be identical to or different from each other, are each hydrogen, straight or branched alkyl of 1 to 4 carbon atoms, allyl or dialkylamino-(alkyl of 1 to 4 carbon atoms),
$R_3$ is phenyl, o-halo-phenyl, o-nitro-phenyl or o-trifluoromethyl-phenyl, and
$R_4$ is halogen, trifluoromethyl or nitro, which comprises reacting a 5-phenyl-1,5-benzodiazepine-2,4-(3H,5H)-dione of the formula

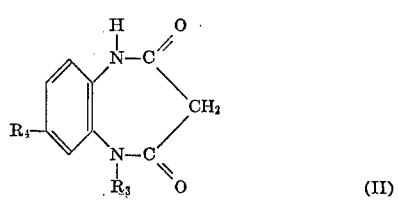

wherein $R_3$ and $R_4$ have the same meanings as in Formula I, with a phosphorus pentahalide and a dialkylformamide for a prolonged period of time at a temperature ranging from slightly below room temperature to moderately elevated temperatures, optionally adding to the reaction mixture an amine of the formula

wherein $R_1$ and $R_2$ have the same meanings as in Formula I, and optionally converting the reaction product thus obtained into an acid addition salt thereof by conventional methods.

The novel process according to the present invention is based on the discovery that a dialkylamino group can be introduced into the 3-position of the benzodiazepine-dione of the Formula II by reaction thereof with a phosphorus pentahalide and a dialkylformamide, and that this dialkylamino group can be exchanged for an amino group of the formula —$NR_1R_2$, if desired.

The reaction pursuant to the instant invention is unexpected and surprising inasmuch as the reaction of a compound of the Formula II with a phosphorus pentahalide and a dialkylformamide, i.e. under strongly acid conditions, and subsequent addition of an amine of the Formula III would have been expected to yield a compound of the formula

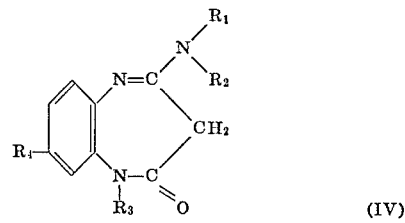

wherein $R_1$, $R_2$, $R_3$ and $R_4$ have the same meanings as in Formula I. In actuality, we have found, however, that a compound of the Formula IV is indeed formed when a compound of the Formula II is reacted with a phosphorus pentahalide and a dialkylformamide, and the intermediate imide-halide of the formula

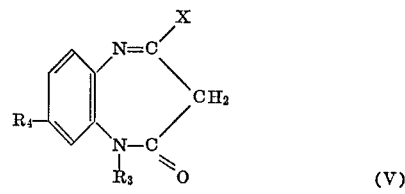

where $R_3$ and $R_4$ have the meanings previously defined and X is halogen, which is formed after a short reaction time, is contacted with an amine of the Formula III. On the other hand, however, if a compound of the Formula II is allowed to react with a phosphorus pentahalide and a dialkylformamide for a prolonged period of time, such as about one hour or longer, and the amine of the Formula III is then optionally added to the reaction mixture, a compound of the Formula I is formed.

While it is possible to obtain the desired compound of the Formula I directly by merely reacting a compound of the Formula II with a phosphorus pentahalide and the corresponding dialkylformamide, we have discovered that in many instances it is more advantageous to use a simple dialkylformamide, such as dimethylformamide, and then add the desired amine of the Formula III, preferably in excess. In the latter case an end product is formed in which the simple dialkylamino radical initially introduced by the simple dialkylformamide has been displaced by the amino radical of the added amine of the Formula III.

If necessary or desirable, one may also first isolate the intermediate compound of the Formula V, which is formed upon reaction of a compound of the Formula II with a phosphorus pentahalide by way of the enol form of compound II, and subsequently further react the intermediate as described above.

The end products of the Formula I are stable organic bases and may, if desired, be converted into acid addition salts with inorganic or organic acids pursuant to conventional methods.

The starting compounds of the Formula II are known compounds and may, for example, be prepared by the methods described in Belgian Pat. No. 710,475.

The compounds embraced by Formula I have not previously been described in the prior art; they are useful as intermediates for the preparation of other 3-substituted 1,5-benzodiazepine-2,4-(3H,5H)-diones, especially those of the formula

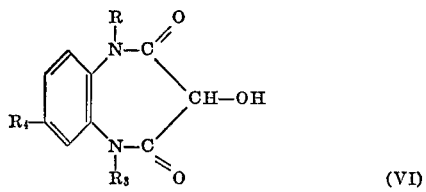

(VI)

wherein R is hydrogen, straight or branched alkyl of 1 to 4 carbon atoms which may optionally be substituted in ω-position by hydroxyl, allyl or cyclopropylmethyl.

These compounds exhibit useful tranquilizing and anti-convulsive properties in warm-blooded animals, such as mice, rats, dogs and minks. It has been found that the elimination rate of these compounds is substantially greater than that of the known commercial tranquilizers. Thus possible chronic side effects may be avoided.

The following examples further illustrate the present invention and will enable others skilled in the art to understand it more completely. It should be understood, however, that the invention is not limited solely to the particular examples given below.

EXAMPLE 1

3-(n-butylamino-methylidene)-7-bromo-5-phenyl-1H-1,5-benzodiazepine-2,4-(3H,5H)-dione 25 gm. of 7-bromo-5-phenyl-1H-1,5-benzodiazepine-2,4-(3H,5H)-dione were dissolved in 300 ml. of dimethylformamide in a 1-liter three-neck flask, the resulting solution was cooled to 10° C., and then a total of 25 gm. of solid phosphorus pentachloride were added in small portions, so that the temperature of the mixture did not rise above 15° C. The reaction mixture was then stirred at room temperature overnight, and thereafter, while cooling the reaction mixture on an ice bath, an excess of n-butylamine was added dropwise until the suspension formed thereby reacted alkaline. Subsequently, the alkaline suspension was evaporated in vacuo, and the residue was admixed with water. The crystals precipitated thereby were collected by vacuum filtration and washed with water and cold methanol, yielding 25 gm. (85.5% of theory) of the compound, M.P. 235° C. (decomp.), of the formula

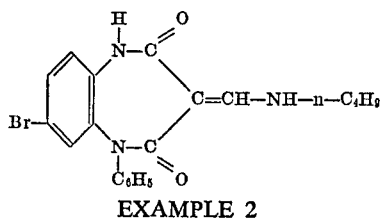

EXAMPLE 2

3-(dimethylamino-methylidene)-5-phenyl-7-chloro-1H-1,5-benzodiazepine-2,4-(3H,5H)-dione 10 gm. of 5-phenyl-7-chloro-1H-1,5-benzodiazepine-2,4-(3H,5H)-dione were dissolved in 100 ml. of warm dimethylformamide, the resulting solution was allowed to cool to room temperature, and then, while stirring the solution, 10 gm. of phosphorus pentachloride were added, and the mixture was allowed to stand at room temperature for 15 hours (overnght). Thereafter, the reaction mixture was poured over ice, the aqueous batch was diluted with one liter of water, and then 6 N sodium hydroxide was added until the suspension formed thereby reacted alkaline. The resulting crystalline slurry was vacuum-filtered, and the filter cake was washed with water until neutral and was then taken up in methylene chloride. The methylene chloride phase was extracted twice with water, dried over magnesium sulfate and evaporated, and the residue was recrystallized from hot ethyl acetate in the presence of charcoal, yielding 8.4 gm. (70.6% of theory) of the compound, M.P. 234–235° C., of the formula

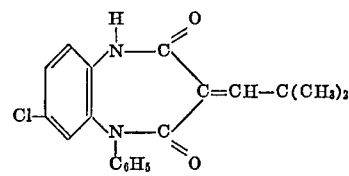

EXAMPLE 3

3-(amino-methylidene)-5-phenyl-7-nitro-1H-1,5-benzodiazepine-2,4-(3H,5H)-dione 5 gm. of 5-phenyl-7-nitro-1H-1,5-benzodiazepine-2,4-(3H,5H)-dione were dissolved in 100 ml. of dimethylformamide, a total of 20 gm. of phosphorus pentachloride were added in small portions to the solution at 20° C., and the mixture was allowed to stand at room temperature for two hours. Thereafter, the reaction mixture was admixed, while cooling, with an excess of liquid ammonia in methanol until alkaline reaction. The alkaline solution was evaporated in vacuo, ice water and ammonia were added to the residue, and the crystalline precipitate formed thereby was collected by vacuum filtration and washed with water. The filter cake was taken up in ethyl acetate, the solution was extracted with water, dried over magnesium sulfate and evaporated, and the residue was recrystallized from ethyl acetate in the presence of charcoal, yielding 4.2 gm. (76.9% of theory) of the compound, M.P. 250–251° C., of the formula

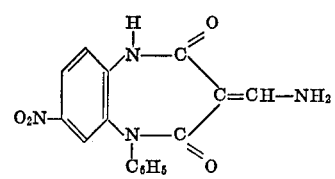

which is vary sparsely soluble in 2 N hydrochloric acid, but readily soluble in semi-concentrated hydrochloric acid.

Its hydrochloride was obtained by dissolving the free base in acetone and acidifying the solution with ethereal hydrochloric acid.

EXAMPLE 4

Using a procedure analogous to that described in Example 1, 3-(methylamino - methylidene) - 5 - phenyl-7-chloro-1,5-benzodiazepine-2,4-(3H,5H)-dione, M.P. 253–254° C., of the formula

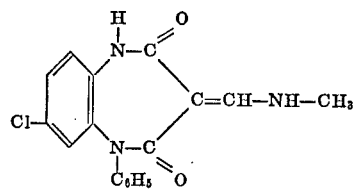

was prepared from 5-phenyl-7-chloro-1H-1,5-benzodiazepine-2,4-(3H,5H)-dione and methylamine.

EXAMPLE 5

Using a procedure analogous to that described in Example 1, 3-(n-butylamino-methylidene)-5-phenyl-7-nitro- 1,5-benzodiazepine-2,4-(3H,5H)-dione, M.P. 226–227° C., of the formula

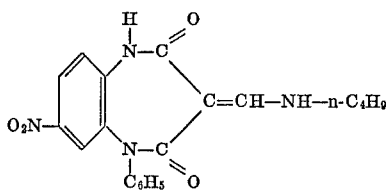

was prepared from 5-phenyl-7-nitro-1H-1,5-benzodiazepine-2,4-(3H,5H)-dione and n-butylamine.

EXAMPLE 6

Using a procedure analogous to that described in Example 3, 3-(amino-methylidene) - 5- phenyl-7-chloro-1,5-benzodiazepine-2,4-(3H,5H)-dione, M.P. 282–285° C., of the formula

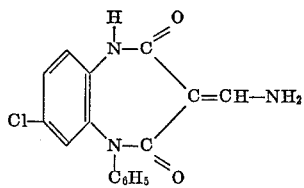

was prepared from 5-phenyl-7-chloro-1H-1,5-benzodiazepine-2,4-(3H,5H)-dione.

EXAMPLE 7

Using a procedure analogous to that described in Example 1, 3-tert.butylamino - methylidene) - 5 - phenyl-7-chloro-1,5-benzodiazepine-2,4-(3H,5H)-dione, M.P. 255–256° C., of the formula

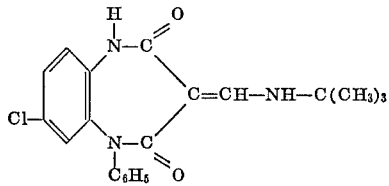

was prepared from 5-phenyl-7-chloro-1H-1,5-benzodiazepine-2,4-(3H,5H)-dione and tert.butylamine.

EXAMPLE 8

Using a procedure analogous to that described in Example 1, 3-[(β-diethylamino-ethyl)-amino-methylidene]-5-phenyl - 7 - chloro - 1,5 - benzodiazepine-2,4-(3H,5H)-dione, M.P. 282–285° C., of the formula

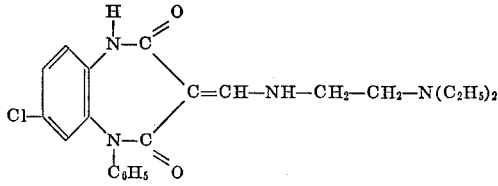

was prepared from 5-phenyl-7-chloro-1H-1,5-benzodiazepine-2,4 - (3H,5H) - dione and N,N-diethyl-ethylenediamine.

EXAMPLE 9

Using a procedure analogous to that described in Example 1, 3-(n-butylamino-methylidene) - 5 - phenyl-7-trifluoromethyl-1,5-benzodiazepine - 2,4 - (3H,5H) - dione, M.P. 155–156° C., of the formula

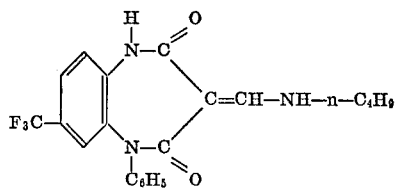

was prepared from 5-phenyl - 7 - trifluoromethyl-1H,1,5-benzodiazepine-2,4-(3H,5H)-dione and n-butylamine.

EXAMPLE 10

Using a procedure analogous to that described in Example 2, 3-(dimethylamino-methylidene) - 5 - phenyl-7-nitro - 1,5 - benzodiazepine - 2,4 - (3H,5H)-dione, M.P. 277° C., of the formula

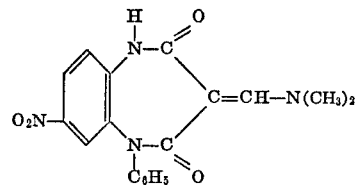

was prepared from 5 - phenyl - 7 - nitro-1H,1,5-benzodiazepine-2,4-(3H,5H)-dione.

EXAMPLE 11

Using a procedure analogous to that described in Example 1, 3 - (isobutylamino-methylidene) - 5 - phenyl-7-chloro-1,5-benzodiazepine-2,4-(3H,5H)-dione, M.P. 198–199° C., of the formula

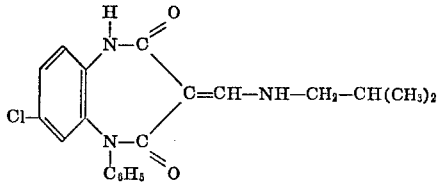

was prepared from 5 - phenyl - 7 - chloro-1H-1,5-benzodiazepine-2,4-(3H,5H)-dione and isobutylamine.

EXAMPLE 12

Using a procedure analogous to that described in Example 1, 3 - (n - butylamino-methylidene) - 5 - (o-fluorophenyl) - 7 - chloro - 1,5 - benzodiazepine-2,4-(3H,5H)-dione, M.P. 208° C., of the formula

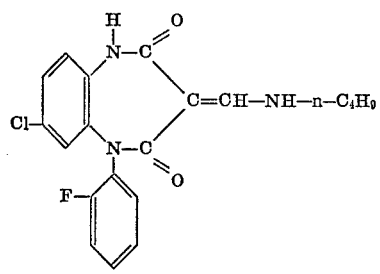

was prepared from 5-(o-fluoro-phenyl)-7-chloro-1H,1,5-benzodiazepine-2,4-(3H,5H)-dione and n-butylamine.

EXAMPLE 13

Using a procedure analogous to that described in Example 1, 3-(n-butylamino-methylidene) - 5 - (o-bromophenyl)-7-chloro - 1,5 - benzodiazepine - 2,4 - (3H,5H)-dione, M.P. 203° C., of the formula

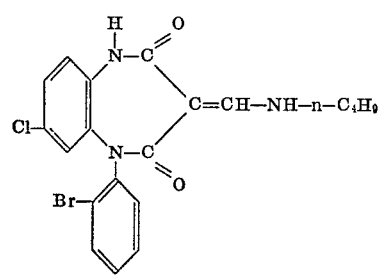

was prepared from 5 - (o - bromo-phenyl) - 7 - chloro-1H,1,5-benzodiazepine-2,4-(3H,5H) - dione and n-butylamine.

EXAMPLE 14

Using a procedure analogous to that described in Example 1, 3 - (allylamino-methylidene)-5-phenyl-7-chloro-1,5-benzodiazepine-2,4-(3H,5H) - dione, M.P. 215–218° C., of the formula

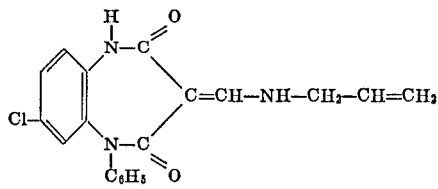

was prepared from 5-phenyl - 7 - chloro-1H,1,5-benzodiazepine-2,4-(3H,5H)-dione and allylamine.

EXAMPLE 15

Using a procedure analogous to that described in Example 1, 3-(n-butylamino-methylidene) - 5 - (o-trifluoromethylphenyl) - 7 chloro-1,5-benzodiazepine - 2,4 - (3H, 5H)-dione, M.P. 208–210° C., of the formula

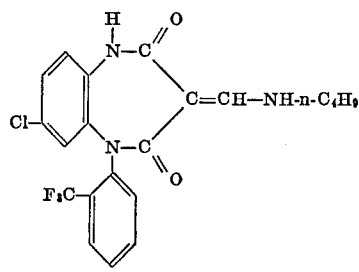

was prepared from 5-(o-trifluoromethyl-phenyl)-7-chloro-1H - 1,5 - benzodiazepine - 2,4 - (3H,5H) - dione and n-butylamine.

EXAMPLE 16

Using a procedure analogous to that described in Example 1, 3 - (n-butylamino-methylidene) - 5 - (o-chlorophenyl) - 7 - chloro - 1,5 - benzodiazepine-2,4-(3H,5H)-dione, M.P. 208–210° C., for the formula

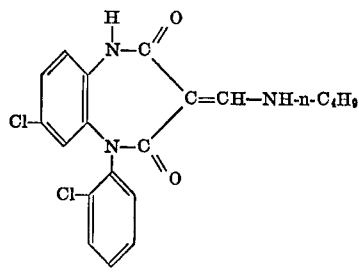

was prepared from 5-(o-chloro-phenyl)- 7 - chloro-1H-1,5-benzodiazepine-2,4-(3H,5H)-dione and n-butylamine.

EXAMPLE 17

Using a procedure analogous to that described in Example 1, 3 - (n-butylamino methylidene) - 5 - (o-nitrophenyl)-7-chloro-1,5-benzodiazepine - 2,4 - (3H,5H) - dione, M.P. 183° C., of the formula

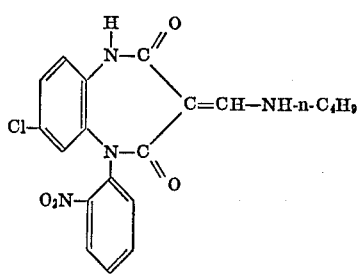

was prepared from 5-(o-nitro-phenyl)-7-chloro-1H-1,5-benzodiazepine-2,4-(3H,5H)-dione and n-butylamine.

EXAMPLE 18

Preparation of 3-hydroxy-5-phenyl-7-trifluoromethyl-1H-1,5-benzodiazepine - 2,4- (3H,5H) - dione from 3-n-butylamino-methylidene - 5 - phenyl-7-trifluoromethyl-1H-1,5-benzodiazepine-2,4-(3H,5H)-dione 0.04 moles=15 g. 3-n-butylaminomethylidene - 7 - trifluoromethyl - 5 - phenyl - 1H - 1,5-benzodiazepine-2,4-(3H,5H)-dione were dissolved in 2.5 l. of pure acetone. 200 ml. of a 6% sulfuric acid and—in the course of 20 minutes—18 g. of potassium permanganate, dissolved in 400 ml. of water, were dropped in. It was stirred for one hour at a temperature between —25 and —30° C., sucked off over kieselguhr, the main part of acetone evaporated and the reaction product taken up in methylene chloride. After drying over magnesium sulfate and evaporation the residue was recrystallized from tetrahydrofurane, yielding 9.6 g.=72% of theory of the title compound, M.P. 260–264° C.

In the way described above the following compounds of the Formula VI may be obtained:

3-hydroxy-1-methyl-5-phenyl-7-trifluoromethyl-1H-1,5-benzodiazepine-2,4-(3H,5H)-dione;
3-hydroxy-1-ethyl-7-bromo-1H-1,5-benzodiazepine-2,4-(3H,5H)-dione;
3-hydroxy-1-methyl-7-bromo-1H-1,5-benzodiazepine-2,4-(3H,5H)-dione;
3-hydroxy-1-methyl-5-(o-fluorophenyl)-7-trifluoromethyl)-1H-1,5-benzodiazepine-2,4-(3H,5H)-dione.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

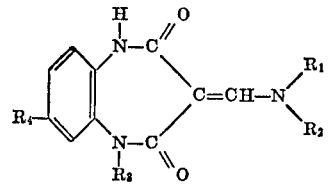

wherein
$R_1$ is hydrogen, or straight or branched alkyl of 1 to 4 carbon atoms,
$R_2$ is hydrogen, straight or branched alkyl of 1 to 4 carbon atoms, allyl or di-lower alkyl-amino-(alkyl of 1 to 4 carbon atoms),
$R_3$ is phenyl, o-halo-phenyl, o-nitro-phenyl or o-trifluoromethyl-phenyl, and
$R_4$ is halogen, trifluoromethyl or nitro,
or an acid addition salt thereof.

2. A compound of claim 1, wherein
$R_1$ is hydrogen or methyl,
$R_2$ is hydrogen, alkyl of 1 to 4 carbon atoms, allyl or diethylamino-ethyl,
$R_3$ is phenyl, o-halo-phenyl, o-nitro-phenyl or o-trifluoromethyl-phenyl, and
$R_4$ is chlorine, bromine, trifluoromethyl or nitro.

3. The process for the preparation of a 3-amino-methylidene-5-phenyl-1,5-benzodiazepine-2,4 - (3H,5H)-dione of the formula

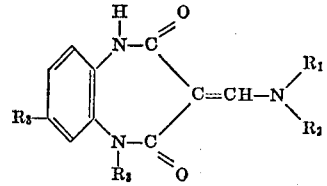

wherein
$R_1$ is hydrogen, or straight or branched alkyl of 1 to 4 carbon atoms,
$R_2$ is hydrogen, straight or branched alkyl of 1 to 4 carbon atoms, allyl or di-lower alkyl-amino-(alkyl of 1 to 4 carbon atoms),
$R_3$ is phenyl, o-halo-phenyl, o-nitro-phenyl or o-trifluoromethyl-phenyl, and
$R_4$ is halogen, trifluoromethyl or nitro,
which comprises reacting a 5-phenyl-1,5-benzodiazepine-2,4-(3H,5H)-dione of the formula

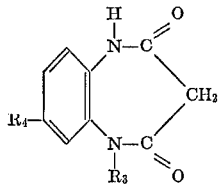

wherein $R_3$ and $R_4$ have the meanings defined above, with a phosphorus pentahalide and a dialkylformamide for a prolonged period of time at a temperature ranging from slightly below room temperature to moderately elevated temperatures, adding to the reaction mixture an excess of an amine of the formula

wherein $R_1$ and $R_2$ have the meanings defined above, and recovering the reaction product.

4. In the process of claim 3, the steps of reacting the said 5-phenyl-1,5-benzodiazepine-2,4 - (3H,5H) - dione first with a phosphorus pentahalide, isolating the intermediate of the formula

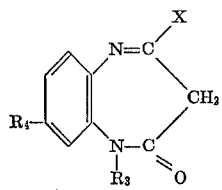

wherein $R_3$ and $R_4$ have the meanings defined above and X is halogen, formed thereby, and subsequently reacting the said intermediate with a di-lower alkyl-formamide.

5. The process for the preparation of a 3-(dimethyl-amino-methylidene-5-phenyl - 1,5 - benzodiazepine - 2,4-(3H,5H)-dione of the formula

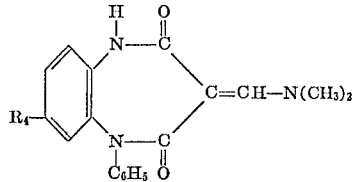

wherein $R_4$ is halogen, trifluoromethyl or nitro, which comprises reacting a 5-phenyl-1,5-benzodiazepine-2,4-(3H, 5H)-dione of the formula

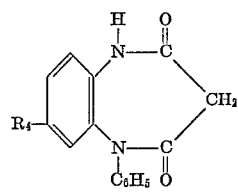

wherein $R_4$ has the meanings defined above, with a phosphorus pentahalide and dimethylformamide at substantially room temperature for a prolonged period of time, and recovering the reaction product.

References Cited
UNITED STATES PATENTS 3,624,076  11/1971  Weber et al. _____ 260—239.3 B HENRY R. JILES, Primary Examiner
R. T. BOND, Assistant Examiner U.S. Cl. X.R.
424—244

UNITED STATES PATENT OFFICE
CERTIFICATE OF CORRECTION

Patent No. 3,766,169     Dated October 16, 1973

Inventor(s) Adolf Bauer et al.

It is certified that error appears in the above-identified patent and that said Letters Patent are hereby corrected as shown below:

Column 8, the last formula should read

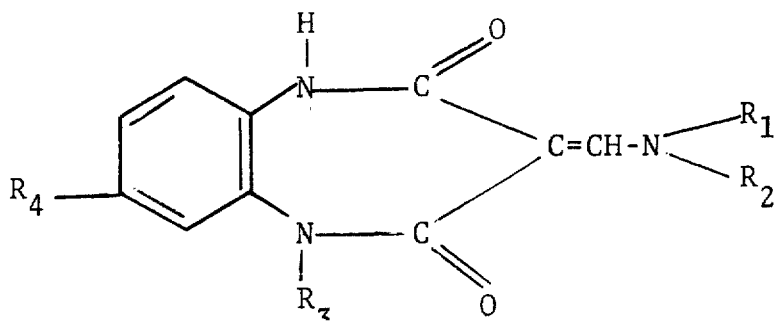

Signed and sealed this 1st day of October 1974.

(SEAL)
Attest:

McCOY M. GIBSON JR.
Attesting Officer

C. MARSHALL DANN
Commissioner of Patents